(12) United States Patent
Kuhl et al.

(10) Patent No.: US 8,190,212 B2
(45) Date of Patent: May 29, 2012

(54) USER-SELECTABLE HEADSET EQUALIZER FOR VOICE CALLS

(75) Inventors: Lawrence Edward Kuhl, Waterloo (CA); Craig Eric Ranta, Kitchener (CA); Per Magnus Fredrik Hansson, Waterloo (CA); Anton Epp, Breslau (CA)

(73) Assignee: Research In Motion Limited, Waterloo (CA)

( * ) Notice: Subject to any disclaimer, the term of this patent is extended or adjusted under 35 U.S.C. 154(b) by 596 days.

(21) Appl. No.: 12/363,800

(22) Filed: Feb. 2, 2009

(65) Prior Publication Data

US 2010/0029337 A1    Feb. 4, 2010

Related U.S. Application Data

(63) Continuation-in-part of application No. 11/848,876, filed on Aug. 31, 2007, now Pat. No. 7,877,116.

(60) Provisional application No. 61/052,434, filed on May 12, 2008.

(51) Int. Cl.
*H04M 1/00* (2006.01)
*H04B 1/38* (2006.01)

(52) U.S. Cl. ............................................ 455/566
(58) Field of Classification Search .................. 455/566
See application file for complete search history.

(56) References Cited

U.S. PATENT DOCUMENTS

| 6,381,469 | B1 * | 4/2002 | Wojick ........................ 455/550.1 |
| 7,016,503 | B2 | 3/2006 | Willis |
| 2009/0061944 | A1 | 3/2009 | Simmons et al. |

OTHER PUBLICATIONS

Operator Field Test Display's, Net Monitor pro telefony NOKIA 6110/5110, 6130/5130, 6150, 8810 as found at URL http://gsm4u.cz/Nokia/Netmonitor/Net_Monitor_N51xx-61xx_a_.

* cited by examiner

*Primary Examiner* — Lincoln Donovan
*Assistant Examiner* — Daniel Rojas
(74) *Attorney, Agent, or Firm* — Ridout & Maybee LLP

(57) ABSTRACT

A method of providing a user interface on a mobile device for enabling a user to select acoustic equalizer settings for voice call downlink audio signals, the mobile device including an internal microprocessor, a display in communication with the microprocessor, and at least one input means in communication with the microprocessor, the method including receiving a request from the user for displaying the user interface, in response to the request, displaying the user interface on the display, the user interface including a plurality of predetermined acoustic equalizer settings, wherein the user selects one of the equalizer settings using the input means, receiving the selected equalizer setting at the microprocessor, storing the selected equalizer setting at the microprocessor, and processing the voice call downlink audio signals according to the selected equalizer setting.

17 Claims, 7 Drawing Sheets

USER-SELECTABLE HEADSET EQUALIZER FOR VOICE CALLS

CROSS REFERENCE TO RELATED APPLICATIONS

The present application is a continuation-in-part of U.S. patent application Ser. No. 11/848,876, filed Aug. 31, 2007, the contents of which are hereby incorporated herein by reference. The present application claims priority to U.S. Provisional Patent Application Ser. No. 61/052,434, filed May 12, 2008, the contents of which are hereby incorporated herein by reference.

FIELD

The present application relates generally to wireless mobile communication devices and, more specifically, to a user interface allowing for user-selectable acoustic equalizer settings for voice calls.

BACKGROUND

When designing a handset for use in mobile telephony, handset designers generally start with an ear model. Additionally, handset designers typically pay close attention to the requirements of the mobile telephone network operators (carriers) that will market and sell the handsets. Currently, carriers require that handsets be designed based on either a "high-leak" ear model or a "low-leak" ear model. In the high-leak ear model, an attempt at forming a seal between a mobile telephone handset and a user's ear is expected to form a consistent seal that has a significant acoustic leak. In the low-leak ear model, an attempt at forming a seal between a mobile telephone handset and a user's ear is expected to form a consistent seal that has insignificant acoustic leak.

A user of that handset may change the position of their ear relative to the handset, and subsequently the acoustic leak, throughout a phone call or based on personal holding position. Also, each user has a different acoustic load due to variations in ear size and shape; accordingly, the user may prefer a lower leak design or a higher leak design.

Tuning a handset often involves creating an optimum acoustic equalizer (EQ) setting. An acoustic EQ setting determines which frequencies of received audio are amplified, and to what extent, before the received audio is sent to a handset speaker, and, potentially, which frequencies are suppressed, and to what extent. The goal is to meet a specific "frequency-versus-level mask". Such masks are determined by standards bodies, such as The 3rd Generation Partnership Project (3GPP, see www.3gpp.org).

However, during operation, users are often unable to form a consistent seal between the ear and the handset, due to movement and changes in position during the voice call. The amount of acoustic leak from the seal is dependent on the manner in which the handset is held by the user and the size and shape of the user's ear. Under those circumstances wherein the user forms a low-leak seal and the handset has been designed with a single acoustic EQ setting that assumes a high-leak seal, the user may complain about poor audio quality. For example, the user may complain that received audio sounds "boomy" or "muddy". Given the variety of user ear shapes and sizes, along with the variety of manners in which users hold the handset, it may be quite difficult to establish a single acoustic EQ setting that will meet the requirements of all users and certification bodies.

BRIEF DESCRIPTION OF THE DRAWINGS

Reference will now be made to the drawings, which show by way of example, embodiments of the invention, and in which.

DETAILED DESCRIPTION OF THE EMBODIMENTS

In one embodiment, a method is disclosed for providing a user interface on a mobile device for enabling a user to select acoustic equalizer settings for voice call downlink audio signals, the mobile device including an internal microprocessor, a display, and at least one input means in communication with the microprocessor, the method including receiving a request from the user for displaying the user interface, in response to the request, displaying the user interface on the display, the user interface including a plurality of predetermined acoustic equalizer settings, wherein the user selects one of the equalizer settings using the input means, receiving the selected equalizer setting at the microprocessor, storing the selected equalizer setting at the microprocessor, and processing the voice call downlink audio signals according to the selected equalizer setting.

The embodiment briefly described above and in further detail below generally relates to a mobile wireless communication device, hereafter referred to as a mobile telephone station apparatus or mobile device. The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

Figure 1:
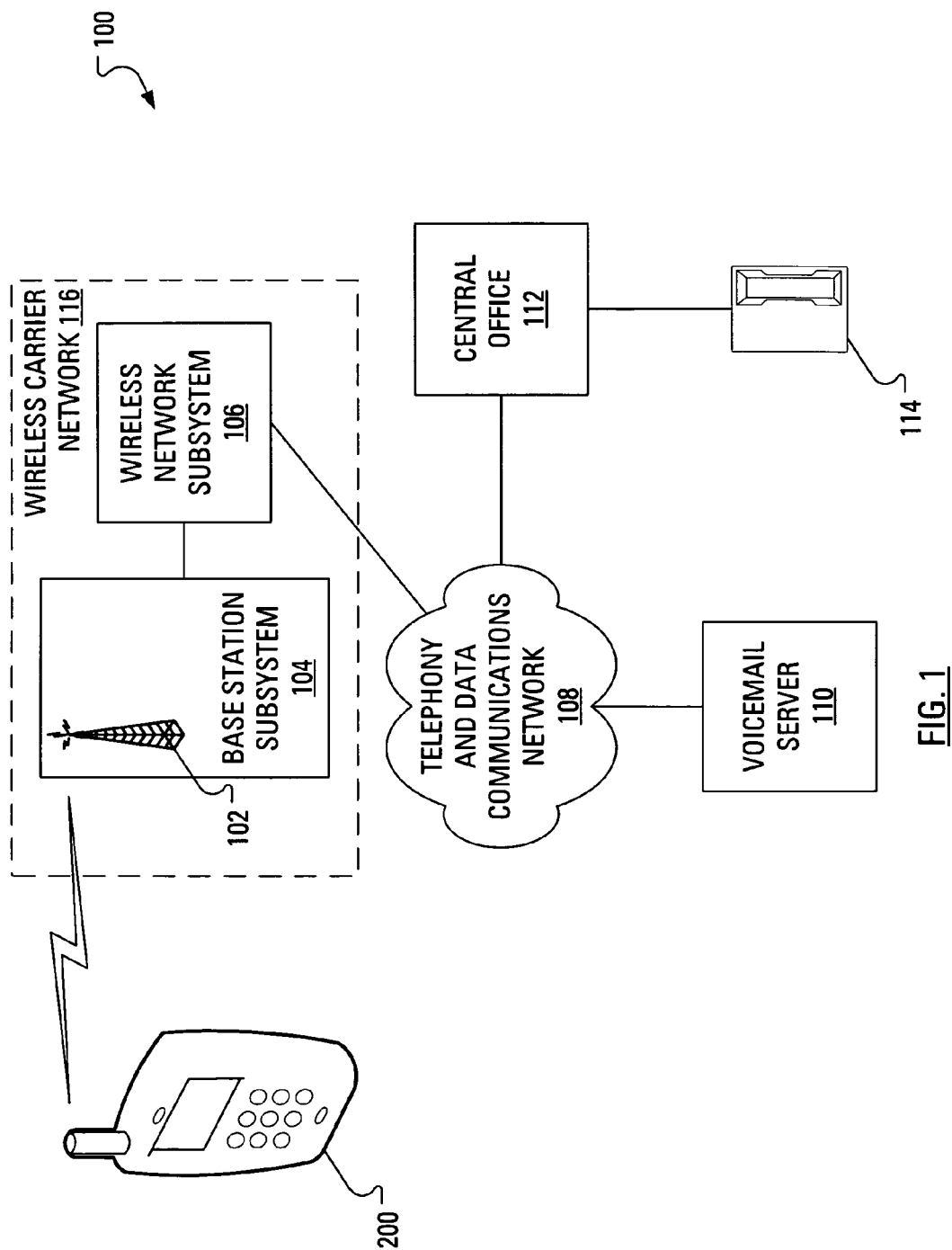
FIG. 1 illustrates elements of an example network environment for the operation of a mobile telephone station apparatus.

To aid the reader in understanding the structure of the mobile device and how it communicates with other devices and host systems, reference will now be made to FIG. 1, which illustrates elements of an exemplary network environment 100 for the operation of a mobile telephone station apparatus 200. The elements of the exemplary network environment 100 include a wireless carrier network 116 and a telephony and data communication network 108.

The telephony and data communication network 108 may be considered to represent at least one wide area network, such as the present day Internet and successor networks, as well as, potentially, multiple local area networks and a public switched telephone network (PSTN), for example.

The wireless carrier network 116 includes a base station subsystem 104 and a wireless network subsystem 106. A base station radio tower 102, with which the mobile telephone station apparatus 200 may communicate wirelessly, is provided as part of the base station subsystem 104. The base station subsystem 104 connects to the wireless network subsystem 106. The wireless network subsystem 106, which may include, in part, a Mobile-services Switching Center (MSC), is connected to the telephony and data communication network 108.

Also connected to the telephony and data communication network 108 is a voicemail server 110 for performing voicemail services, such as receiving, storing, and providing voicemail messages.

A central office 112 allows a traditional land-line telephone station apparatus 114 to connect to and utilize the telephony and data communication network 108. Additionally, the land-line telephone station apparatus 114 can connect to the voicemail server 110. The land-line telephone station apparatus 114 can access the data communication network 108 or voicemail server 110 by an input device such as a keypad (not shown).

Figure 2:
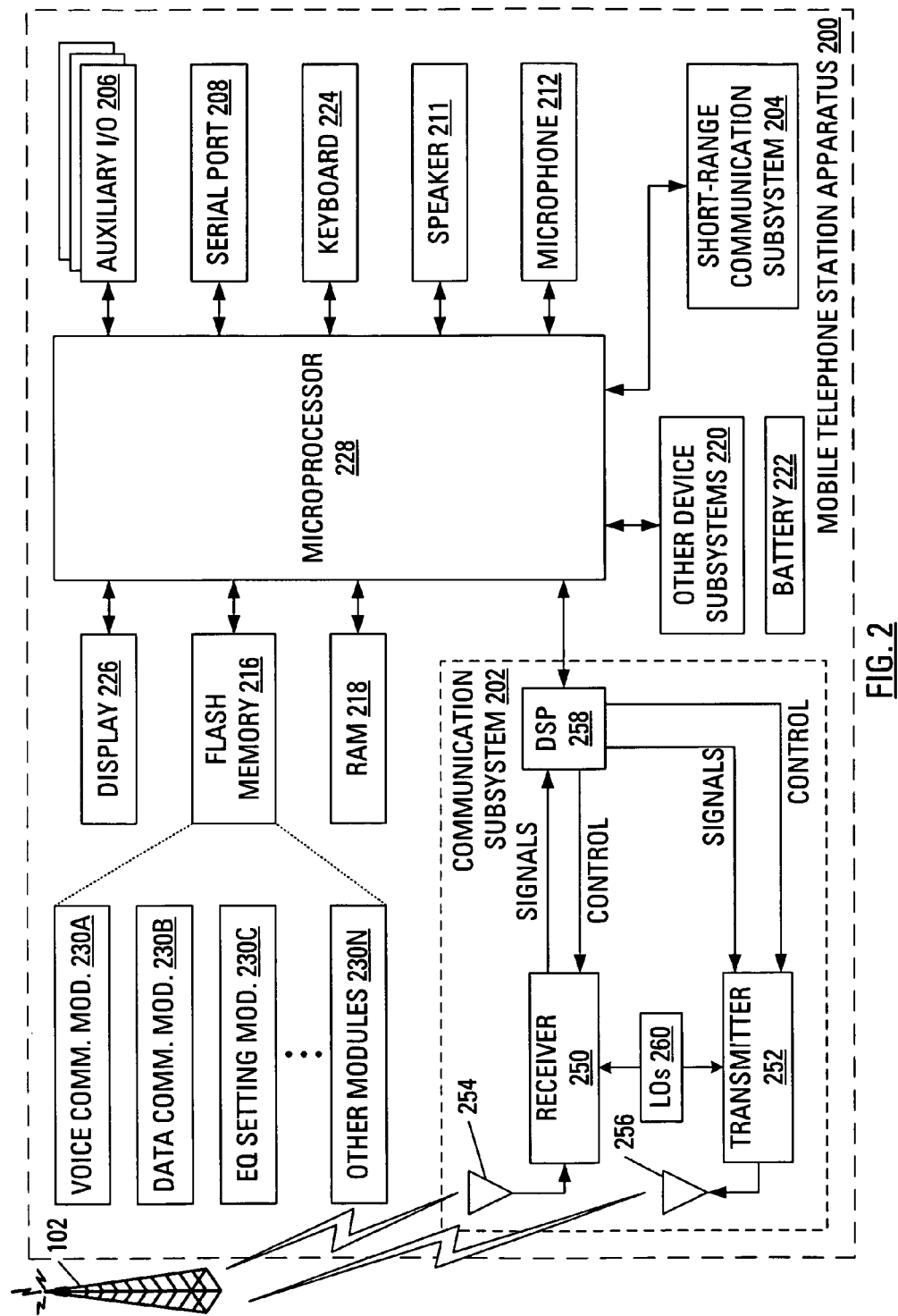
FIG. 2 illustrates an example structure for the mobile telephone station apparatus of FIG. 1.

FIG. 2 illustrates the mobile telephone station apparatus 200 including a housing, an input device (such as a keyboard 224 or a navigation tool (not shown), and an output device (a display 226), which may be a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile telephone station apparatus 200, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the mobile telephone station apparatus 200 are shown schematically in FIG. 2. These include: a communication subsystem 202; a short-range communication subsystem 204; the keyboard 224 and the display 226, along with other input/output devices including a set of auxiliary input/output devices 206, a serial port 208, a speaker (an audio output device) 211 and a microphone 212; as well as memory devices including a flash memory 216 and a Random Access Memory (RAM) 218; and various other device subsystems 220. The mobile telephone station apparatus 200 may have a battery 222 to power the active elements of the mobile telephone station apparatus 200. As stated above, the mobile telephone station apparatus 200 may be a two-way radio frequency (RF) communication device having voice and data communication capabilities. In addition, the mobile telephone station apparatus 200 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile telephone station apparatus 200. A predetermined set of software applications that control basic device operations, such as a voice communications module 230A and a data communications module 230B, may be installed on the mobile telephone station apparatus 200 during manufacture. An equalizer setting module 230C may also be installed on the mobile telephone station apparatus 200 during manufacture, to implement aspects of the application. As well, additional software modules, illustrated in FIG. 2 as other software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via the wireless carrier network 116. The data items managed by the PIM application may be seamlessly integrated, synchronized and updated via the wireless carrier network 116 with the device user's corresponding data items stored or associated with a host computer system.

Communication functions, including data and voice communications, may be performed through the communication subsystem 202 and, possibly, through the short-range communication subsystem 204. The communication subsystem 202 includes a receiver 250, a transmitter 252 and one or more antennas, illustrated in FIG. 2 as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile telephone station apparatus 200 is intended to operate. For example, the communication subsystem 202 of the mobile telephone station apparatus 200 may be designed to operate any of a variety of voice communication networks, such as Advanced Mobile Phone Service (AMPS), Time Division Multiple Access (TDMA), CDMA, Personal Communications Service (PCS), GSM, GSM/GPRS, Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile telephone station apparatus 200.

When required network registration or activation procedures have been completed, the mobile telephone station apparatus 200 may send and receive communication signals over the wireless carrier network 116. Signals received from the base station radio tower 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station radio tower 102 are processed (e.g., modulated and encoded) by the DSP 258 and are then provided to the transmitter 252 for digital to analog conversion, frequency up conversion, filtering, amplification and transmission to the base station radio tower 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 202 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touchpad, a rocker switch, a thumb-wheel, a trackball, a touch screen, or some other type of input device. The composed data items may then be transmitted to the base station radio tower 102 via the communication subsystem 202.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile telephone station apparatus 200. In addition, the display 226 may also be utilized in voice communication mode, for example, to provide a call display screen for displaying the identity of a calling party, the duration of a voice call, or other voice call related information.

The short-range communication subsystem 204 enables communications between the mobile telephone station apparatus 200 and other proximate systems or devices, which need not necessarily be similar devices. For example, the short-range communication subsystem 204 may include an infrared device and associated circuits and components, or a Bluetooth™ communication module, to provide for communication with similarly-enabled systems and devices.

Reference will now be made to FIGS. 3-7. It has been known in personal audio players to offer a user a variety of acoustic EQ settings to suit the primary type of music (e.g., Rock, Hip Hop, Classical, Dance, Electronic, Jazz, Latin, Lounge, Pop, R & B) played on the player or to suit the primary listening device (e.g., small speakers) used to convert the output signal created by the player to audible sounds. However, it has heretofore been unknown to offer acoustic EQ settings to users of mobile telephony handsets for voice call audio.

In overview, and according to an aspect of the present application, a user may adjust acoustic EQ settings used by a handset prior to or during an ongoing call. In particular, the microprocessor 228 may be configured to provide an acoustic EQ settings user interface, described in further detail with reference to FIGS. 4-7, the acoustic EQ settings user interface allowing a user to select from among several predetermined acoustic EQ settings for processing voice call downlink audio. Once the microprocessor 228 has received, from the user, an indication of a selected acoustic EQ setting, the microprocessor 228 may process voice call downlink audio based on the selected acoustic EQ setting.

Figure 3:
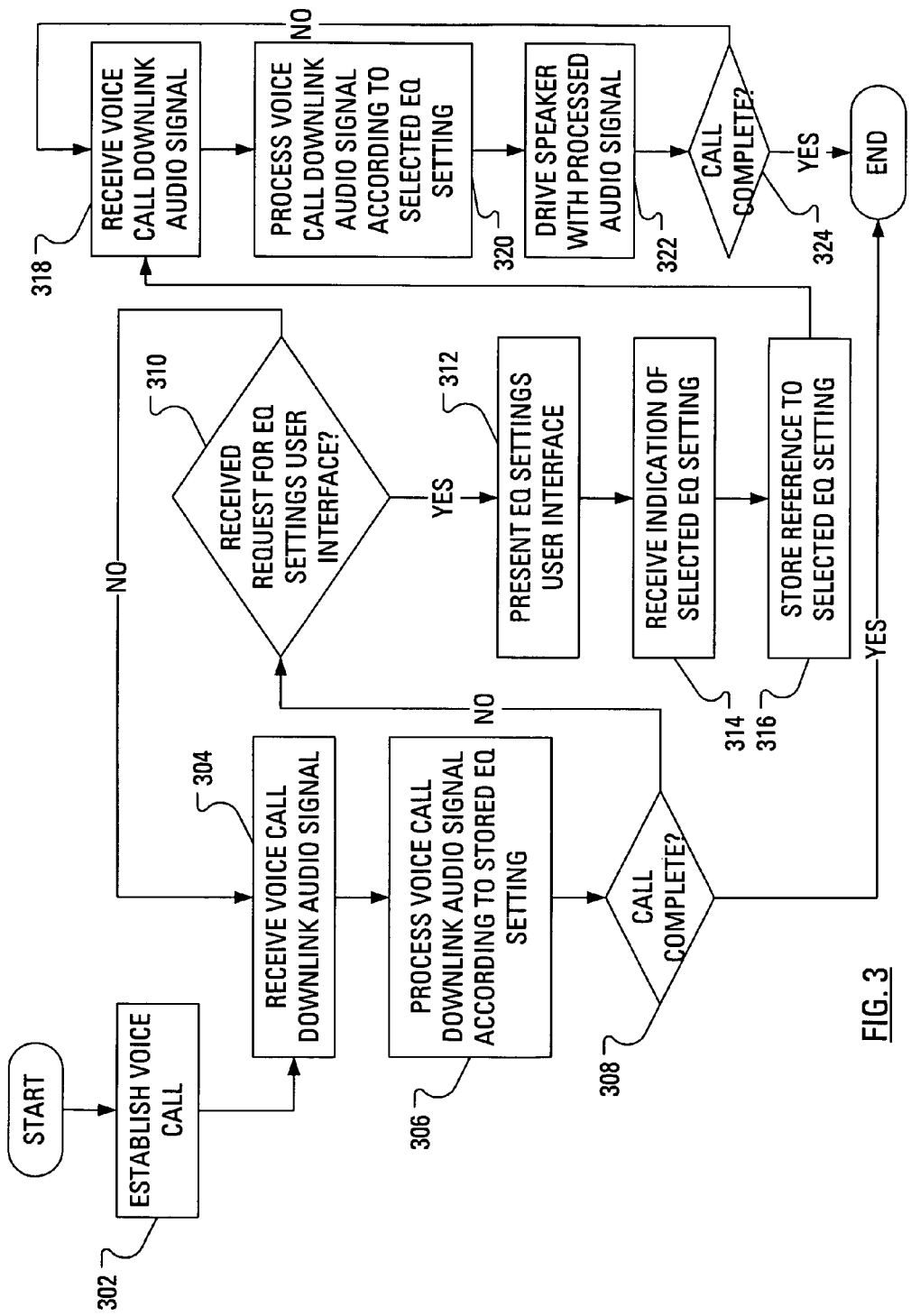
FIG. 3 illustrates an example method of allowing for users to select an acoustic equalizer setting for an ongoing voice call.
Figure 4:
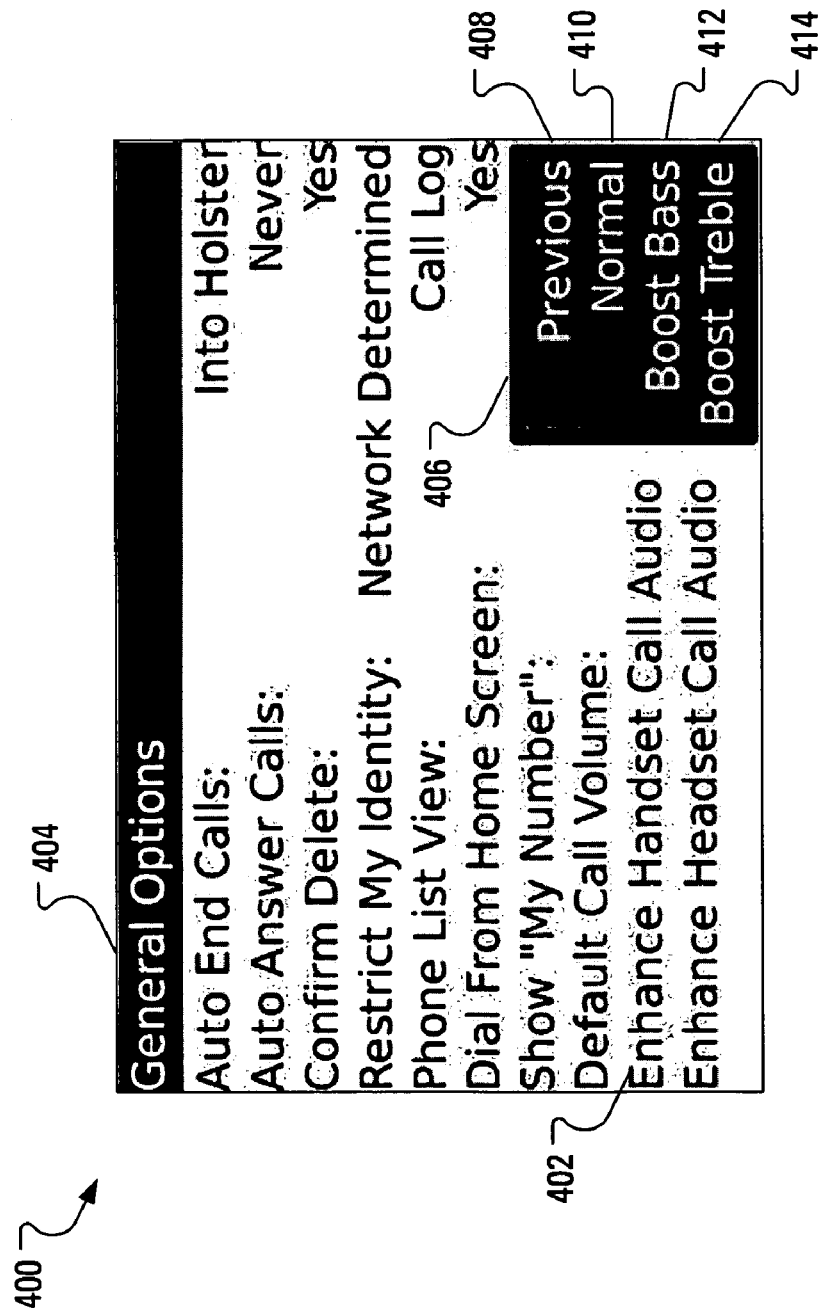
FIG. 4 is an example of a screenshot of a user interface provided to a user in accordance with the method of FIG. 3.
Figure 5:
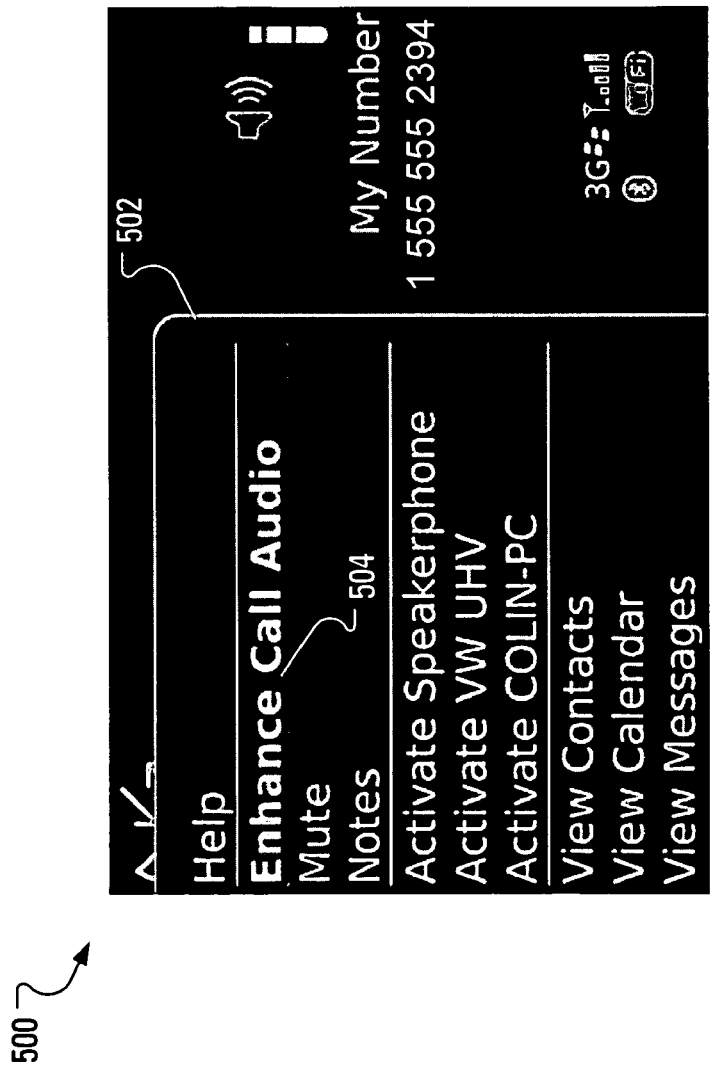
FIG. 5 is an example of a screenshot of a user interface provided to a user in accordance with the method of FIG. 3.
Figure 6:
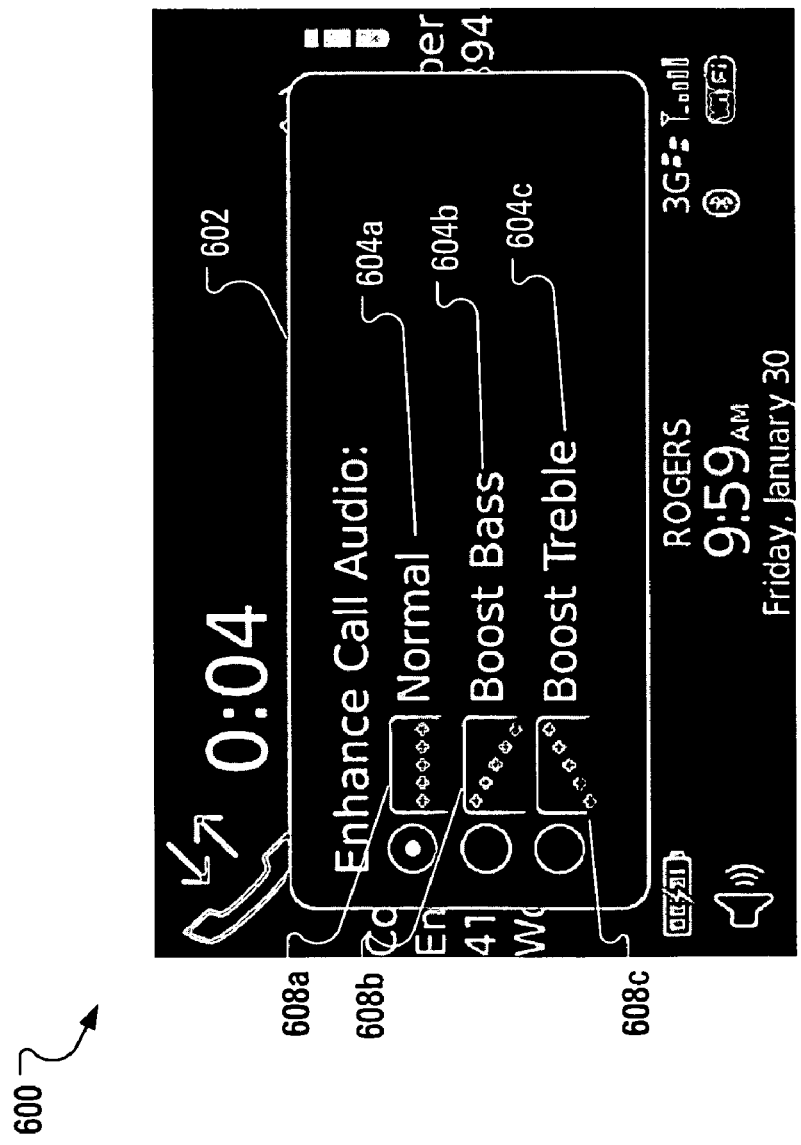
FIG. 6 is an example of a screenshot of a user interface provided to a user in accordance with the method of FIG. 3.

Specifically, and referring to FIG. 3, when the user wishes to adjust the acoustic EQ setting while a voice call is ongoing, the microprocessor 228 will be involved in establishing (block 302) a voice call over a wireless telephony link. Once the voice call has been established, the mobile telephone station apparatus 200 receives (block 304) a voice call downlink audio signal over the wireless telephony link. The microprocessor 228 processes (block 306) the voice call audio downlink signal according to an acoustic EQ setting for which a reference has previously been stored.

The microprocessor 228 may periodically determine (block 308) whether the voice call is still ongoing. If the microprocessor 228 determines that the voice call is ongoing, the microprocessor 228 may periodically determine (block 310) whether a request for the acoustic EQ settings user interface has been received. If the microprocessor determines that such a request has not been received, the receipt (block 304) and the processing (block 306) of voice call downlink audio signals continues.

However, the microprocessor 228 may determine (block 310) that a request for the acoustic EQ settings user interface has been received. Responsive to such determining, the microprocessor 228 presents (block 312) the acoustic EQ settings user interface to the user, for instance, by way of the display 226, which will be described in further detail below with reference to FIGS. 4-7. Responsive to being presented with the acoustic EQ settings user interface, the user may manipulate the keyboard 224 and/or some other auxiliary I/O device 206 to select one of the predetermined acoustic EQ settings. Subsequent to the selection, by the user, of one of the predetermined acoustic EQ settings, the microprocessor 228 receives (block 314) an indication of the selected one of the predetermined acoustic EQ settings. Upon receiving an indication of the selected acoustic EQ setting, the microprocessor 228 stores (block 316) a reference to the selected acoustic EQ setting.

The mobile telephone station apparatus 200 continues to receive (block 318) voice call downlink audio signals. The microprocessor 228 then processes (block 320) the voice call audio downlink signals according to the acoustic EQ setting for which a reference was stored in block 316. The processing (block 320) generates a processed audio signal, which is used by the microprocessor 228 to drive (block 322) the speaker 211 (in one instance). In other instances, the microprocessor 228 uses the processed audio signal to drive other audio output devices among the auxiliary I/O devices 206.

The microprocessor 228 may again periodically determine (block 324) whether the voice call is still ongoing. If the microprocessor 228 determines that the voice call is ongoing, the receipt (block 318), the processing (block 320) and the driving (block 322) also continues. However, if the microprocessor 228 determines that the voice call is no longer ongoing, the microprocessor 228 discontinues the receiving, the processing and the driving of the audio signal.

An example of two embodiments of the user interface and corresponding screenshots for the above-identified method are shown in FIGS. 4-7, although it is recognized that the disclosure is not limited to the described embodiments. Specifically and as shown in screenshot 400, if the user wishes to set the acoustic EQ settings prior to the establishment of a voice call (block 302), they can access a list of the acoustic EQ settings by selecting an "Enhance Handset Call Audio" option 402 from a "General Options" menu 404 displaying a list of call settings. It is contemplated that the General Options menu 404 can be accessed via a home or main screen (not shown) of the display 226, although it is recognized that access of the menu 404 is not limited to the above scenario. It is contemplated that such selection can also be accomplished utilizing either a specific key on the keyboard 224, or one of the auxiliary I/O devices 206, such as a trackball or a touch screen, for example. It is also contemplated that a convenience key (not shown) on the device could be configured to open the General Options menu 404.

Upon selection of the option 402, a drop-down menu 406 will appear on the screen, providing several predetermined EQ settings for adjusting the current acoustic EQ settings, such as a "Previous" setting 408 (i.e., the previously stored setting), a "Normal" setting 410 (the default setting), a "Boost Bass" setting 412 (where lower frequency audio is amplified), and a "Boost Treble" setting 414 (where higher frequency audio is amplified), although the menu 406 is not limited to these settings. For example, it is also contemplated that the user could configure a personal acoustic EQ setting based on their audio preferences.

The user then selects the desired setting by scrolling or navigating to the appropriate line, as described above with respect to block 314. Alternatively, if the user has assigned the convenience key (not shown) to open the General Options menu 404, it is contemplated that they could scroll through the predetermined settings by pushing the convenience key until the desired setting appears on the display 226, pressing the convenience twice, for example, to select the desired setting. Although the settings 408-414 are textually displayed in drop-down menu 406, it is appreciated that visual displays of the settings may also be appropriate. Once selected, the microprocessor receives and stores the desired acoustic EQ setting (blocks 314 and 316), and the voice call downlink audio signals received by the microprocessor are processed in accordance with the desired acoustic EQ setting (blocks 318-322).

Figure 7:
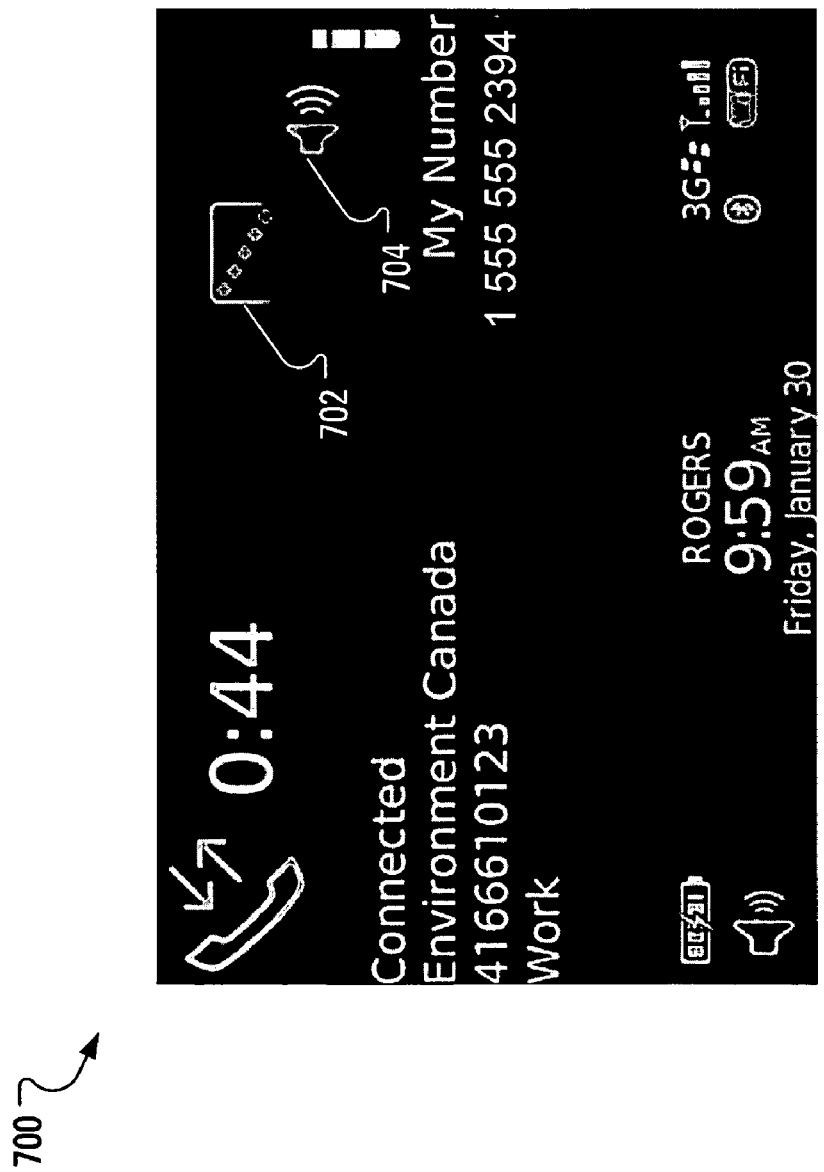
FIG. 7 is an example of a screenshot of a user interface provided to a user in accordance with the method of FIG. 3.

To provide visual representation to the user that their selection has been stored, it is contemplated that a visual icon 702 (FIG. 7) corresponding to the selected setting will be displayed on the home screen (not shown) of the display 226, which will be described in further detail below with reference to FIG. 7. It is further contemplated that the selected setting will remain in effect for all future voice calls, unless the user elects to change the setting, either prior to establishing the voice call, as described above, or during an ongoing call, as discussed in further detail below.

Specifically, and as shown in screenshot 500 (FIG. 5), if the user wishes to change the previously selected settings during an ongoing call (i.e., after the call has been established at block 302), they can submit a request to the microprocessor 228 for the acoustic EQ settings user interface (block 310) by pressing a menu key (not shown) on the keyboard 224, at which point a pop-up menu 502 will appear on the display 226, enabling the user to select an "Enhance Call Audio" option 504. As known in the art, the user can scroll to the desired option 504 using such I/O devices 206 as the trackball, directional arrows, touch screen or appropriate keys on the keyboard 224. Also, as described above with respect to FIG. 4, it is appreciated that the user could utilize the convenience key to bring up the pop-up menu 502, pressing the key until the "Enhanced Call Audio" option 504 is shown on the display 226.

Upon selection of the "Enhance Call Audio" option 504, a screenshot 600 (FIG. 6) is shown on the display 226, presenting the EQ settings to the user (block 312). For example and as shown in screenshot 600, a menu 602 is displayed, providing both a textual and a visual display of several acoustic EQ settings. Specifically, and by way of example only, the menu 602 could include a "Normal" setting having a textual display 604a and a visual display 604b, a "Boost Bass" setting having a textual display 606a and a visual display 606b, and a "Boost Treble" setting having a textual display 608a and a visual display 608b. It is contemplated that by providing both visual and textual displays of the settings, the user will easily be able to identify and select the desired acoustic EQ setting for the phone call. However, it will be appreciated that the menu 602 is not limited to the settings or displays shown in FIG. 6.

Again utilizing one of the keyboard 224 and the auxiliary I/O devices 206, such as the track ball or convenience key, the user selects the desired acoustic setting, which is received and stored by the microprocessor 228 (blocks 314 and 316), replacing the previously stored setting. After the selection is stored, a screenshot of a call display screen 700 is shown on the display 226, and will remain on the display during the duration of the call. As seen in FIG. 7, a visual icon 702 corresponding to the selected acoustic EQ setting is displayed on the call screen 700, indicating to the user that the voice call downlink audio signals are now being processed in accordance with the desired setting. The visual icon 702 corresponds to one of the visual displays 604b, 606b and 608b provided in the previous screenshot 600. It is contemplated that the icon 702 provides an easily understandable indication to the user that the command was received and that the desired acoustic EQ setting is in operation. The visual icon 702 will remain prominently displayed on the call screen, such as adjacent to a "speaker" icon 704 (which is commonly utilized to indicate an ongoing call), although it is appreciated that the visual icon 702 could appear in other locations on the call display screen 700.

It is contemplated that upon termination of the call, the acoustic EQ settings will remain stored in the currently selected setting, such that the user does not have to select a setting for each individual call. Accordingly, upon conclusion of the call, the visual icon 702 can remain on the home screen of the display 226. It is also contemplated that the visual icon 702 can be removed from the home screen of the display 226, to ensure sufficient space on the display.

Alternatively, upon termination of the call, the acoustic EQ settings can revert back to the setting previously selected from the drop-down menu 406. Accordingly, the visual icon 702 will be changed to indicate the previously selected setting, and will remain on the home screen, providing a visual notification that the previously selected setting will be applied to future audio links.

As described above and as shown in FIGS. 4 and 6, the predetermined acoustic EQ settings may, for example, include: an Increased Bass acoustic EQ setting, wherein lower frequency audio is amplified; an Increased Treble acoustic EQ setting, wherein higher frequency audio is amplified; and a Normal or Flat acoustic EQ setting, wherein no part of the audio spectrum is amplified. Each of the acoustic EQ settings may be defined in an acoustic configuration file stored in the memory (216 or 218) of the mobile telephone station apparatus 200. However, it is recognized that the present disclosure is not limited to the above acoustic EQ settings.

Additionally, one of the predetermined acoustic EQ settings may be a "handset mode" acoustic EQ setting (not shown), a "speakerphone mode" acoustic EQ setting (not shown), a "wired headset mode" acoustic EQ setting (not shown), or a "wireless headset mode" acoustic EQ setting (not shown). It is to be appreciated that the above-described user interface is not limited to these acoustic EQ settings, and that additional settings may be appropriate, depending on the application.

Although the particular application is described above as relating to mobile telephony handsets, it should be clear to a person of ordinary skill in the art that the selection and use of an acoustic equalizer setting from among a plurality of predetermined acoustic equalizer settings has applicability to wired telephony as well. Additionally, it is recognized that mobile telephony can extend beyond traditional cellular telephone networks. In particular, users of portable computing devices with wireless networking capabilities, using, for example, IEEE 802.11b, 802.11a, 802.11g or 802.11n, may execute Voice-over-Internet-Protocol (VoIP) telephony applications. It should be clear that user-selectable acoustic EQ settings have applicability in wireless or wired VoIP telephony settings.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of providing a user interface on a mobile device for enabling a user to select acoustic equalizer settings for voice call downlink audio signals, the mobile device including a microprocessor, and a display in communication with the microprocessor, the method including:
    displaying an acoustic equalizer settings screen on the display, the screen including a plurality of predetermined acoustic equalizer settings;
    receiving a selected equalizer setting;
    storing the selected equalizer setting;
    during a voice call:
        displaying, on the display, a visual icon corresponding to the selected equalizer setting; and
        processing the voice call downlink audio signals according to the selected equalizer setting.

2. The method of claim 1 wherein said plurality of predetermined acoustic equalizer settings, included in said user interface, includes at least one of a textual display and a visual display of each of the acoustic equalizer settings.

3. The method of claim 1 wherein said input means is at least one of a keyboard and a trackball.

4. The method of claim 1 wherein the receiving of the selected equalizer settings occurs during the voice call.

5. The method of claim 1 wherein the receiving of the selected equalizer setting occurs prior to establishment of the voice call.

6. The method of claim 1, wherein said plurality of predetermined acoustic equalizer settings comprise a plurality of equalizer settings selected from: a normal setting, a boost bass setting or a boost treble setting.

7. The method of claim 1, wherein said plurality of predetermined acoustic equalizer settings comprise a previous equalizer setting.

8. A mobile device on which a user interface for managing calls received at the mobile device is provided, the mobile device comprising a microprocessor, a display, and at least one input device, wherein the mobile device is configured for:
    displaying an acoustic equalizer settings screen on the display, the screen including a plurality of predetermined acoustic equalizer settings;
    receiving an indication of a selected setting, selected from among the plurality of predetermined acoustic equalizer settings;
    storing the selected setting; and
    during a voice call:
        displaying, on the display, of a visual icon corresponding to the selected setting; and
        processing voice call downlink audio signals in accordance with the selected setting.

9. The mobile device of claim 8 wherein said screen of acoustic equalizer settings includes at least one of a visual indicator and a textual indicator corresponding to each of the settings.

10. The mobile device of claim 8 wherein said receiving the indication of the selected setting occurs during the voice call.

11. The mobile device of claim 8 wherein said receiving the indication of the selected setting occurs prior to establishment of the voice call.

12. The mobile device of claim 8, wherein said plurality of predetermined acoustic equalizer settings comprise a plurality of equalizer settings selected from:
    a normal setting, a boost bass setting or a boost treble setting.

13. The mobile device of claim 8, wherein said plurality of predetermined acoustic equalizer settings comprise a previous equalizer setting.

14. A user interface for a mobile device, the mobile device including a display for displaying the user interface, a microprocessor, and at least one input means in communication with the microprocessor, the user interface including:
    a first screen arranged for providing a user an object to select with said input means, to initiate specifying audio settings for a voice call;
    a second screen configured for display responsive to the user selection of said object on said first screen, said second screen including a plurality of predetermined acoustic equalizer settings, said predetermined acoustic equalizer settings specifying a manner in accordance with which audio signals received by the microprocessor are to be processed during said voice call; and
    a call display screen arranged for display during the voice call, including a visual icon corresponding to the selected equalizer setting.

15. The user interface of claim 14 wherein said call display screen includes a speaker icon adjacent said visual icon on said call display screen for indicating the selected equalizer setting to the user.

16. The user interface of claim 14 wherein said second screen includes at least one of a textual indicator and a visual indicator of each of the predetermined acoustic equalizer settings.

17. The user interface of claim 14, wherein said plurality of predetermined acoustic equalizer settings comprise a plurality of equalizer settings selected from:
    a normal setting; a boost bass setting; or a boost treble setting.

* * * * *